United States Patent [19]

Ohtomo et al.

[11] Patent Number: 5,554,693
[45] Date of Patent: Sep. 10, 1996

[54] COMPOSITIONS OF POLYPHENYLENE ETHER AND POLYAMIDE RESINS CONTAINING TERPENE PHENOL RESINS

[75] Inventors: Takashi Ohtomo, Utsunomiya; Koji Myojo, Mishima; Hiroshi Kubo, Moka, all of Japan

[73] Assignee: General Electric Company, Pittsfiled, Mass.

[21] Appl. No.: 526,346

[22] Filed: Sep. 11, 1995

[30] Foreign Application Priority Data

Oct. 11, 1994 [JP] Japan .................. 6-270202

[51] Int. Cl.$^6$ .................. C08L 71/12; C08L 77/00
[52] U.S. Cl. .................. 525/133; 525/391; 525/397
[58] Field of Search .................. 525/397, 133, 525/391

[56] References Cited

U.S. PATENT DOCUMENTS

| | | | |
|---|---|---|---|
| H,1,387 | 12/1994 | Hansen et al. | 525/92 D |
| 4,315,086 | 2/1982 | Ueno et al. | 525/391 |
| 4,338,421 | 7/1982 | Maruyama et al. | 525/397 |
| 4,600,741 | 7/1986 | Aycock et al. | 524/139 |
| 4,642,358 | 2/1987 | Aycock et al. | 549/245 |
| 4,654,405 | 3/1987 | Jalbert | 525/391 |
| 4,659,760 | 4/1987 | van der Meer | 524/141 |
| 4,728,693 | 3/1988 | Droscher et al. | 525/181 |
| 4,732,938 | 3/1988 | Grant et al. | 525/397 |
| 4,743,651 | 3/1988 | Shibuya et al. | 525/96 |
| 4,745,157 | 5/1988 | Yates III, et al. | 525/133 |
| 4,755,566 | 7/1988 | Yates III | 525/391 |
| 4,760,115 | 7/1988 | Droescher et al. | 525/132 |
| 4,772,664 | 9/1988 | Ueda et al. | 525/397 |
| 4,792,586 | 12/1988 | Han | 525/88 |
| 4,798,865 | 1/1989 | Grant et al. | 525/149 |
| 4,822,836 | 4/1989 | Wroczynski | 524/139 |
| 4,822,837 | 4/1989 | van der Meer | 524/153 |
| 4,824,915 | 4/1989 | Aycock et al. | 525/397 |
| 4,826,933 | 5/1989 | Grant et al. | 525/397 |
| 4,839,425 | 6/1989 | Manatari et al. | 525/397 |
| 4,857,575 | 8/1989 | van der Meer et al. | 524/398 |
| 4,859,739 | 8/1989 | Yates III, et al. | 525/397 |
| 4,866,114 | 9/1989 | Taubitz et al. | 524/100 |
| 4,873,286 | 10/1989 | Gallucci et al. | 525/133 |
| 4,874,810 | 10/1989 | Lee, Jr. et al. | 524/505 |
| 4,877,847 | 10/1989 | Masu et al. | 525/397 |
| 4,885,334 | 12/1989 | Mayumi et al. | 525/66 |
| 4,888,397 | 12/1989 | van der Meer et al. | 525/391 |
| 4,889,889 | 12/1989 | Yates III | 525/66 |
| 4,923,924 | 5/1990 | Grant | 525/66 |
| 4,929,675 | 5/1990 | Abe et al. | 525/66 |
| 4,957,965 | 9/1990 | Taubitz et al. | 525/66 |
| 4,960,825 | 10/1990 | van der Meer | 524/505 |
| 4,963,620 | 10/1990 | Grant et al. | 525/68 |
| 4,968,749 | 11/1990 | Shibuya et al. | 525/66 |
| 4,981,920 | 1/1991 | Terashima et al. | 525/397 |
| 4,990,564 | 2/1991 | Taubitz et al. | 525/64 |
| 5,000,897 | 3/1991 | Chambers | 264/141 |
| 5,001,181 | 3/1991 | Takagi et al. | 524/401 |
| 5,017,652 | 5/1991 | Aba et al. | 525/68 |
| 5,019,626 | 5/1991 | Taubitz et al. | 525/66 |
| 5,026,787 | 6/1991 | Takagi et al. | 525/391 |
| 5,039,746 | 8/1991 | Neugebauer et al. | 525/152 |
| 5,041,504 | 8/1991 | Brown et al. | 525/396 |
| 5,053,458 | 10/1991 | Taubitz et al. | 252/391 |
| 5,055,494 | 10/1991 | van der Meer | 521/61 |
| 5,069,818 | 12/1991 | Aycock et al. | 525/397 |
| 5,070,151 | 12/1991 | Mizuno et al. | 525/397 |
| 5,073,596 | 12/1991 | Inoue et al. | 525/148 |
| 5,073,620 | 12/1991 | Sanada et al. | 525/68 |
| 5,084,523 | 1/1992 | Neugebauer et al. | 525/397 |
| 5,086,105 | 2/1992 | Abe et al. | 524/492 |
| 5,091,473 | 2/1992 | Arashiro et al. | 525/133 |
| 5,096,979 | 3/1992 | Brown et al. | 525/396 |
| 5,109,052 | 4/1992 | Kasai et al. | 524/505 |
| 5,112,907 | 5/1992 | Nishio et al. | 525/64 |
| 5,115,010 | 5/1992 | Sakai et al. | 524/410 |
| 5,115,044 | 5/1992 | Neugebauer | 525/392 |
| 5,120,800 | 6/1992 | Tsukahara et al. | 525/390 |
| 5,120,801 | 6/1992 | Chambers | 525/397 |
| 5,122,575 | 6/1992 | White et al. | 525/397 |
| 5,124,391 | 6/1992 | Muehlbach et al. | 524/420 |
| 5,134,196 | 7/1992 | van der Meer | 524/235 |

(List continued on next page.)

FOREIGN PATENT DOCUMENTS

| | | |
|---|---|---|
| 0147874B1 | 7/1985 | European Pat. Off. . |
| 0221341B1 | 5/1987 | European Pat. Off. . |
| 0222129B1 | 5/1987 | European Pat. Off. . |
| 0234063B1 | 9/1987 | European Pat. Off. . |
| 0237187A1 | 9/1987 | European Pat. Off. . |
| 0253123A1 | 1/1988 | European Pat. Off. . |
| 0292153A2 | 11/1988 | European Pat. Off. . |
| 0314000A2 | 5/1989 | European Pat. Off. . |
| 0344590A2 | 12/1989 | European Pat. Off. . |
| 0351590A2 | 1/1990 | European Pat. Off. . |
| 0362439A1 | 4/1990 | European Pat. Off. . |
| 0369169A1 | 5/1990 | European Pat. Off. . |
| 0381390A2 | 8/1990 | European Pat. Off. . |
| 0398043A3 | 11/1990 | European Pat. Off. . |
| 0400418A1 | 12/1990 | European Pat. Off. . |
| 0436136A1 | 7/1991 | European Pat. Off. . |
| 0451563A2 | 10/1991 | European Pat. Off. . |
| 0452783A2 | 10/1991 | European Pat. Off. . |
| 0506386A2 | 9/1992 | European Pat. Off. . |
| 0501175A1 | 9/1992 | European Pat. Off. . |
| 0550206A2 | 12/1992 | European Pat. Off. . |
| 0516150A1 | 12/1992 | European Pat. Off. . |
| 0528581A1 | 2/1993 | European Pat. Off. . |
| 0559485A1 | 3/1993 | European Pat. Off. . |
| 0549268A2 | 6/1993 | European Pat. Off. . |
| 0491187A1 | 6/1993 | European Pat. Off. . |
| 0523368A1 | 12/1993 | European Pat. Off. . |
| 597648A1 | 5/1994 | European Pat. Off. . |
| 3-185055 | 8/1991 | Japan . |
| 4-39354 | 2/1992 | Japan . |
| 4-88058 | 3/1992 | Japan . |
| 4-202256 | 7/1992 | Japan . |
| 4-198354 | 7/1992 | Japan . |
| WO88/0617 | 8/0000 | WIPO . |
| WO93/13251 | 7/1993 | WIPO . |

*Primary Examiner*—Thomas Hamilton, III

[57] ABSTRACT

Thermoplastic compositions are provided containing polyphenylene ether resin, polyamide resin and terpene phenol having a hydroxyl value of 45 or above. The compositions have outstanding coating film adhesion.

12 Claims, No Drawings

U.S. PATENT DOCUMENTS

| | | | |
|---|---|---|---|
| 5,145,904 | 9/1992 | Muehlbach et al. | 524/494 |
| 5,147,942 | 9/1992 | Abe et al. | 525/397 |
| 5,153,266 | 10/1992 | Muehlbach et al. | 525/66 |
| 5,159,008 | 10/1992 | Nishida et al. | 524/494 |
| 5,159,018 | 10/1992 | Nishio et al. | 525/132 |
| 5,159,075 | 10/1992 | Phanstiel et al. | 544/218 |
| 5,162,433 | 11/1992 | Nishio et al. | 525/66 |
| 5,162,440 | 11/1992 | Akkepeddi et al. | 525/149 |
| 5,162,447 | 11/1992 | Abe et al. | 525/390 |
| 5,166,237 | 11/1992 | Abe et al. | 524/114 |
| 5,175,211 | 12/1992 | Sanada et al. | 525/66 |
| 5,182,151 | 1/1993 | Furata et al. | 525/397 |
| 5,182,336 | 1/1993 | Abe et al. | 525/132 |
| 5,210,125 | 5/1993 | Pernice et al. | 524/426 |
| 5,212,256 | 5/1993 | Mizuno et al. | 525/395 |
| 5,225,270 | 7/1993 | Bhoori et al. | 428/280 |
| 5,237,002 | 8/1993 | Nishio et al. | 525/66 |
| 5,244,973 | 9/1993 | Sakazume et al. | 525/66 |
| 5,248,728 | 9/1993 | Lee, Jr. | 525/149 |
| 5,262,478 | 11/1993 | Nishio et al. | 525/68 |
| 5,266,673 | 11/1993 | Tsukahara et al. | 528/212 |
| 5,288,786 | 2/1994 | Nishio et al. | 524/451 |
| 5,296,533 | 3/1994 | Nagaoka et al. | 524/430 |
| 5,310,821 | 5/1994 | Kodaira et al. | 525/397 |
| 5,331,060 | 7/1994 | Aycock et al. | 525/397 |
| 5,336,732 | 8/1994 | Samuels | 525/397 |
| 5,378,750 | 1/1995 | Sayed et al. | 524/400 |

COMPOSITIONS OF POLYPHENYLENE ETHER AND POLYAMIDE RESINS CONTAINING TERPENE PHENOL RESINS

BACKGROUND OF THE INVENTION

1. Field of the Invention

The present invention relates to a resin composition containing polyphenylene ether (also abbreviated in the following as PPE) and polyamide resin (also abbreviated in the following as PA).

2. Description of the Related Art

Thermoplastic resin compositions consisting of PPE resin and PA resin show outstanding thermal resistance, fabrication properties, oil resistance, and organic solvent resistance. Moreover, as such resin compositions which also include rubber polymers show outstanding shock resistance, they are used in automobile components, electrical and electronic components, mechanical components, etc. In particular, as they are well suited for inline coating, they are in extensive use in external automobile components. For example, they are used in external components such as wheel covers, bumpers, and spoilers, and outside panels such as fenders.

However, as the PPE which is the main component of PPE/PA resin compositions has the property of undergoing yellow discoloration when exposed to light, it is generally used in coated form when it is applied in external automobile components. It is used with paints such as acrylic urethane paint, acrylic amino paint, and polyester polyol paint, but these paints cannot be said to show sufficient adhesion to the PPE/PA resin composition, and when they are used for direct coatings, peeling of the coating film may occur, depending on the form and position of the molded product in question. For this reason, the main method now used is to first apply a coat of primer to the molded product, followed by a finish coat. However, with the recent tendency towards cutting costs, attitudes towards coatings have also tended to shift toward the primerless approach, and there has been a changeover toward thinner coating films. For this reason, a demand has arisen for molded materials in which sufficient adhesion strength can be obtained even when the molded product is directly coated.

For this reason, the purpose of the present invention is to provide a PPE/PA resin composition showing outstanding coating film adhesion.

SUMMARY OF THE INVENTION

Bearing the above factors in mind, the inventors of the present invention conducted thorough research on PPE/PA resin compositions and discovered that when a specified terpene phenol resin is added to a PPE/PA resin composition, the coating film adhesion of the composition is considerably improved, thus arriving at the present invention.

Specifically, the present invention provides a thermoplastic resin composition characterized by containing (A) 10–80 parts by weight of polyphenylene ether resin and (B) 90–20 parts by weight of polyamide resin, and by containing (C) 0.3–10 parts by weight of terpene phenol having a hydroxyl value of 45 or above with respect to a total of 100 parts by weight of (A) and (B).

DETAILED DESCRIPTION OF THE INVENTION

Any commonly known PPE resin may be used as component (A). The term PPE resin is a general designation for a polymer such as that shown in the following general formula (Chemical Formula 1):

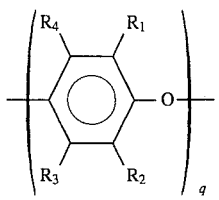

wherein in the formula, $R_1$, $R_2$, $R_3$, and $R_4$ indicate monovalent substituents selected from among hydrogen atoms, halogen atoms, alkyl groups, alkoxy groups, and haloalkyl or haloalkoxy groups having at least two carbon atoms between the halogen atom and the phenyl ring and which do not contain tertiary-carbon, and q is an integer indicating the degree of polymerization, and this may be either one of the polymers shown by the above general formula alone or a copolymer consisting of a combination of two or more of these polymers.

There are no particular restrictions on the method of manufacturing PPE. For example, this may be produced by reacting phenols according to the procedures presented in the specifications of U.S. Pat. Nos. 3,306,874, 3,257,357, or 3,257,358. Examples of these phenols include 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl-6-cyclohexylphenol, 2-methyl-6-tolyl)phenol, 2-methyl-6-methoxyphenol, 2-methyl-6-butylphenol, 2,6-dimethoxyphenol, 2,3,6-trimethylphenol, 2,3,5,6-tetramethylphenol, 2,6-diethoxyphenol, etc., but the invention is not limited to these. One may either use a corresponding homopolymer obtained by reacting one of the above substances or a corresponding copolymer obtained by reacting two or more of the above substances and having the different units contained in the above formula.

A preferred specific example of $R_1$ and $R_2$ is an alkyl group having 1–4 carbon atoms, and a preferred example of $R_3$ and $R_4$ is a hydrogen atom or an alkyl group having 1–4 carbon atoms. Possible examples include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, and poly(2-ethyl-6-propyl-1,4-phenylene) ether. Moreover, an example of the PPE copolymer is a copolymer partially containing an alkyl trisubstituted phenol such as 2,3,6-trimethylphenol in the aforementioned polyphenylene ether repeated unit.

Moreover, these PPE resins may also be copolymers having a styrene compound grafted on. An example of such a styrene-compound-grafted polyphenylene ether is a copolymer obtained by graft polymerization of a styrene compound such as styrene, α-methylstyrene, vinylstyrene, or chlorostyrene onto the aforementioned PPE.

In the present invention, in order to improve the compatibility of PPE and PA, PPE in which the end group is modified using a base which can react with an amino base, such as an epoxy base, carboxyl base, or acid anhydride, may be substituted for part or all of the aforementioned PPE and used. Epoxidation, carboxylation, or acid anhydridation of the PPE end group may be carried out by any commonly-known method.

An example of epoxidation of an end group is presented in Japanese Laid Open Patent Application No. 88-125525. The end-epoxidated PPE may be obtained by bringing PPE and a substance having an epoxy group into contact while heating them. Preferred examples of the compound having an epoxy group are an epoxy compound in which one of the ends is a halogen group or an epoxy compound in which both of the ends are epoxy groups. Specific preferred examples of single-end epoxidated substances include epichlorohydrin and 2-methylepichlorohydrin, preferred examples of double-end epoxidated substances include 2,2-bis(4-glycidoxyphenyl)propane and epoxy resin. From the standpoint of preventing block formation among the PPE resins, single-end epoxidated compounds are preferred.

An example of methods for single-end carboxylation and acid anhydridation is presented in Japanese Patent No. 87-500456. The end-carboxylated or acid anhydridated PPE may be obtained by reacting an acid chloride having a carboxyl group or acid anhydride group such as trimellitic acid anhydride chloride with PPE.

The aforementioned endgroup modified PPE need not be a substance in which all of the end groups have been modified, and it should preferably contain unmodified end groups, for example, in the amount of 70% by weight or less with respect to the total volume of the PPE of component (A).

Moreover, component (A) may also contain a styrene resin together with PPE if desired. Examples of preferred styrene resins include homopolystyrene and rubber reinforced polystyrene (HIPS). The styrene resin should preferably be contained in the amount of 90–0 parts by weight with respect to 10–100 parts by weight of PPE resin.

Next, the (B) polyamide resin used in the present invention is a substance having an amide bond (—CO—NH—) on the polymer main chain. Typical examples include nylon-4, nylon-6, nylon-12, nylon-6,6, nylon-4,6, nylon-6,10, nylon-6,12, nylon-6,T (hexamethylenediamine/terephthalic acid), nylon-MXD,6 (meta-xylylenediamine/adipic acid), nylon-6, 6T (epsilon caprolactam/hexamethylenediamine/terephthalic acid), nylon-66,6T (hexamethylenediamine/adipic acid/terephthalic acid), nylon-6T,6I (hexamethhylenediamine/terephthalic acid/isophthalic acid), mixtures of nylon-6 and nylon-66, polyamide from terephthalic acid and trimethylhexamethylenediamine, polyamide from adipic acid, azelaic acid, and 2,2-bis(4-aminocyclohexyl)propane, polyamide from terephthalic acid and 4,4'-diaminodicyclohexylmethane, copolymer nylons thereof, and mixtures thereof. However, the invention is not limited to these substances.

The aforementioned (A) and (B) are blended in in the amount of 90–20 parts by weight of (B) with respect to 10–80 parts by weight of (A). The preferred upper limit of (A) is 70 parts by weight, and its preferred lower limit is 15 parts by weight. The preferred upper limit of (B) is 85 parts by weight, and its preferred lower limit is 30 parts by weight. A preferred ratio is 85–30 parts by weight of (B) with respect to 15–70 parts by weight of (A). If (A) is present in too small an amount or (B) is present in too large an amount, this will have a detrimental effect on the heat resistance and dimensional stability of the resin composition, and if (A) is present in too large an amount or (B) is present in too small an amount, this will have a detrimental effect on the fabrication properties of the resin composition.

The terpene phenol resin of (C) is at copolymer of a terpene and a phenol and is known per se. Terpenes are hydrocarbons expressed by the formula $(C_5H_8)_n$ or an acid-containing compound derived therefrom, such as monoterpenes (when n=2, examples include myrcene, ocimene, pinene, limonene, citroneol, borneol, menthol, and camphor), sesquiterpenes (when n=3, examples include curcumin), diterpenes (when n=4, examples include camphorene and hinokiol), tetraterpenes (when n=8, examples include carotenoids), and polyterpenes (natural rubber). The preferred terpenes are monoterpenes, particularly pinene, limonene, etc.

Phenols are compounds having at least one hydroxyl group on an aromatic ring such as a benzene ring or naphthalene ring, and they may also have a substituent on the aromatic ring (such as a halogen atom or an alkyl group). Examples include phenol, cresol, xylenol, naphthol, catechol, resorcinol, hydroquinone, and pyrogallol. The preferred type of phenol is phenol itself.

The preferred terpene phenol resin is a copolymer of monoterpenes and phenol. A copolymer of monoterpenes such as α-pinene or limonene and phenol which can easily be manufactured on an industrial scale is even more preferable. In the case of a copolymer of limonene and phenol, an example of a possible structural formula is shown in Chemical Formula 2.

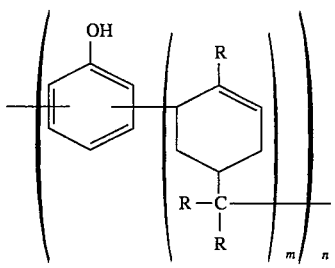

wherein in the formula, R indicates a methyl group, and m and n are integers indicating the respective degree of polymerization, preferably integers from 2 to 10.

In the present invention, the terpene phenol resin must have a hydroxyl value of 45 or above, and preferably of 50 or above. There are no particular limitations on the upper limit value, but it should be 250 or less for the purposes of practical application. If the hydroxyl value is too low, coating adhesion will be poor. Moreover, the hydroxyl value indicates the number of mg of potassium hydroxide required to neutralize acetic acid bound to a hydroxyl group when 1 g of the sample is acetylated. Measurement of the hydroxyl value was carried out as follows:

(1) The sample was prepared as described below.

(a) Acetylating reagent: 25 g of acetic anhydride is placed in a 100 ml volumetric flask, pyridine is added to a total volume of 100 ml, and the mixture is thoroughly agitated.

(b) Phenolphthalein solution: 1 g of phenolphthalein is dissolved in 100 ml of ethyl alcohol.

(c) N/2 potassium hydroxide ethyl alcohol solution: 35 g of potassium hydroxide is dissolved in as small an amount of water as possible, ethyl alcohol is added to make 1 l, and the mixture is then left standing for 2–5 days and filtered. Titration is carried out according to JIS K 8006.

(2) The operating procedure is as described below.

The sample is precisely measured into a round-bottom flask, and exactly 5 ml of acetylating reagent is added to this. A small funnel is placed in the opening of the flask, and the bottom of the flask is then immersed in a 95°–100° C. glycerin bath to a depth of approximately 1 cm and heated. In order to prevent the temperature of the neck of the flask from increasing during this heating, a disk of filter paper with a hole in the middle is used to cover the base of the neck of the flask. After 1 hour, the flask is removed from the bath, and after being left standing, 1 ml of water is added through the funnel and the mixture is agitated in order to break down the acetic anhydride. In order to complete this breakdown process, the flask is again heated for 10 minutes in a glycerin bath, and after being allowed to cool, the funnel and the walls of the flask are rinsed with 5 ml of ethyl alcohol and titration is conducted with an N/2 potassium hydroxide ethyl alcohol solution using a phenolphthalein solution as an indicator. Moreover, a blank test is carried out in parallel with this test.

(3) Hydroxyl values were calculated according to the following numerical formula $$A=\{[(B-C) \times f \times 28.05]/S\}+D$$

In the formula,

A: hydroxyl value,

B: amount of N/2 potassium hydroxide ethyl alcohol used in the blank test (ml),

C: amount of N/2 potassium hydroxide ethyl alcohol solution used in the main test (ml), f: factor of N/2 potassium hydroxide ethyl alcohol solution, S: sample (g), and D: acid value.

Reactions between terpenes and phenols are commonly known, and various methods for carrying out such reactions are known, but the terpene phenol resin used in the present invention may be synthesized by any of these synthesis methods.

The aforementioned terpene phenol resin may be obtained as a commercial product. Examples include Mighty Ace G-125, G-150, YP-50 (trade name, manufactured by Yasuhara Yushi Kogyo K.K.) and Nirez 2150 or 2040 (trade name, manufactured by Arizona Chemical Co.).

Component (C) is mixed in in the amount of 0.3–10 parts by weight with respect to a total of 100 parts by weight of (A) and (B). The preferred range is 0.5–5 parts by weight. If the amount used drops below the aforementioned lower limit value, there will be little effect of improving adhesion to the coating film, and on the other hand, if the amount added is greater than the aforementioned upper limit value, this will impair the outstanding mechanical properties, particularly the impact resistance, of the PPE/PA resin composition.

The resin composition of the present invention, in addition to the aforementioned components, may also contain rubber polymers as optional components. Rubber polymers include natural rubber polymers, which are elastic at room temperature, as well as synthetic polymers. Specific examples include natural rubber, butadiene polymer, styrene-isoprene copolymer, butadiene-styrene copolymer (including random copolymers, block copolymers, graft copolymers, etc.), isoprene polymer, chlorobutadiene polymer, butadiene-acrylonitrile copolymer, isobutylene polymer, isobutylene-butadiene copolymer, isobutylene-isoprene copolymer, acrylic acid ester polymer, ethylene-propylene copolymer, ethylene-propylene-diene copolymer, thiokol rubber, polysulfide rubber, polyurethane rubber, polyether rubber (such as polypropylene oxide, etc.), and epichlorohydrin rubber.

These rubber polymers may be produced using any polymerization method (such as emulsion polymerization or solution polymerization) and using any catalyst (such as peroxide, trialkylaluminum, halogenated lithium, or nickel catalysts). Moreover, one may also use substances having various degrees of crosslinking, substances having varying microstructures (such as a cis structure, a trans structure, or a vinyl group), or substances having rubber particles of varying average diameter. Moreover, any type of copolymer, such as random copolymers, block copolymers, or graft copolymers may be used. Furthermore, in producing these rubber polymers, copolymers with monomers such as other olefins, dienes, aromatic vinyl compounds, acrylic acid, acrylic acid esters, methacrylic acid esters, etc., are also possible. These copolymers may be produced by any copolymerization method, such as random copolymerization, block copolymerization, or graft copolymerization. Specific examples of these monomers include ethylene, propylene, styrene, chlorostyrene, α-methylstyrene, butadiene, isobutylene, chlorobutadiene, butene, methyl acrylate, acrylic acid, ethyl acrylate, butyl acrylate, methyl methacrylate, and acrylonitrile. Among these substances, styrene-butadiene block copolymer (SBS), styrene-isoprene block copolymer (SIS), and styrene-butadiene block copolymer or styrene-isoprene block copolymer in which a part or all of the butadiene and isoprene portions have been hydrogenated are preferred. From the standpoint of thermal stability, hydrogenated SBS (SEBS) and hydrogenated SIS (SEPS) in which all of the double bonds have been hydrogenated are particularly preferred.

Moreover, one may also use substances in which these rubber polymers have been modified using epoxy compounds, unsaturated carboxylic acid, derivatives thereof, etc.

These rubber polymers should be contained in the amount of 50 parts by weight or less with respect to a total of 100 parts by weight of (A)+(B)+(C), and preferably 40 parts by weight or less, with the amount of 5–30 parts by weight being particularly preferred.

Moreover, as mentioned previously, it is possible to modify the ends of PPE in order to promote improved compatibility between PPE and PA, and compatibilizing agents may also be added to the composition of the present invention in order to improve compatibility between PPE and PA. In this case, any commonly-known compatibilizing agent may be used. Preferred compatibilizing agents include polycarboxylic acids such as citric acid and malic acid and their derivatives, compounds in which the molecule contains (a) a double bond or triple bond and (b) a carboxylic acid group, acid anhydride group, acid amide group, imide group, carboxylic acid ester group, or epoxy group, such as maleic anhydride, and trimellitic anhydride chloride. Such compatibilizing agents may be used individually or in combinations of two or more, and they may also be used together with peroxide as needed. Such compatibilizing agents should preferably be included in the amount of 10 parts by weight or less with respect to a total of 100 parts by weight of (A)–(C), with the amount of 0.5–5 parts by weight being particularly preferable.

Moreover, in the case of modification of PPE using trimellitic anhydride chloride, chloride scavengers such as metal oxides should preferably be added.

Furthermore, provided that they do not have a detrimental effect on the physical properties of the present invention, commonly used additives such as pigments, dyes, reinforcing agents (glass fibers, carbon fibers, etc.), fillers (carbon black, silica, titanium oxide, etc.) thermal resistance agents, antioxidants, weatherproofing agents, lubricants, mold-releasing agents, crystal nucleating agents, plasticizers, flame retardants, fluidity-improving agents, and antistatic agents may also be added to the composition of the present invention.

There are no particular restrictions on the method of manufacturing the resin composition of the present invention, and the various components may be blended by any commonly known method, and melt kneading may then be carried out to obtain the composition. Melt kneading may be carried out by any commonly used method. Examples of kneading equipment which may be used include extruding machines, kneaders, Banbury mixers, etc. There are no particular restrictions on the order of mixing and kneading in this process, and this order may be selected as desired. For example, manufacturing may be carried out by mixing together specified amounts of components (A)–(C) and optional components as needed and then carrying out melt kneading using a kneading machine, etc. Alternatively, it is also possible to individually knead combinations of the various components, blend all of the combinations together, and then carry out kneading. The composition may also be prepared using an extruder equipped with multiple feed openings, etc. by means of successive feeding of one or more of the various components. In this case, at least component (A) should be included among the components supplied from the first feed opening. Moreover, in the case of use of a compatibilizer, preliminary kneading or preliminary mixing should preferably be carried out at least with PPE and the compatibilizer. For example, after PPE is reacted with substances such as citric acid and maleic anhydride in advance and modified, the PA can then be kneaded. In this manner, one can effectively proceed with functionalization of PPE, and one can obtain a PPE/PA resin composition which shows outstandingly stable compatibility with component (B).

EXAMPLES

The following is a detailed explanation of the present invention by means of practical examples, but the invention is not limited to these examples.

The following compounds were used in the practical examples:

Component (A)

PPE: Poly(2,6-dimethyl-1,4-phenylene) ether having an intrinsic viscosity (chloroform, 25° C.) of 0.46 dl/g HIPS: Rubber reinforced polystyrene (HT644; trade name, manufactured by Mitsubishi Kasei Kogyo K.K.)

Component (B)

Polyamide (PA): Polyamide 6 having a relative viscosity of 2.6 (25° C., in 98% sulfuric acid, a terminal amino group concentration of $8.5 \times 10^{-5}$ mol/g, and a terminal carboxyl group concentration of $3.5 \times 10^{-5}$ mol/g

Component (C)

Mighty Ace G-150 (trade name, manufactured by Yasuhara Yushi Kogyo K.K.): A copolymer of limonene and phenol having an average molecular weight of 700, a softening point of 150° C., and a hydroxyl value of 128.4. This is referred to in the following as TP-1.

Nirez 2150 (trade name, manufactured by Arizona Chemical Co.): A copolymer of limonene and phenol having an average molecular weight of 780, a softening point of 150° C., and a hydroxyl value of 84.6. This is referred to in the following as TP-2.

Nairetsu 2019 (trade name, manufactured by Arizona Chemical Co.): A copolymer of α-pinene and phenol having an average molecular weight of 655, a softening point of 123° C., and a hydroxyl value of 42.7 (used in the comparison example). This is referred to in the following as TP-3.

Optional Components

Rubber copolymer

SBS: Styrene-butadiene-styrene copolymer (Califlex TR1101; trade name, manufactured by Shell Kagaku K.K.)

SEPS: Styrene-ethylene-propylene-styrene copolymer (Septen 2006; trade name, manufactured by Kurare K.K.)

SEBS: Styrene-ethylene/butylene-styrene copolymer (Kraton G1651; trade name, manufactured by Shell Kagaku K.K.)

Compatibilizing agent

Citric acid

Moreover, the coatings and test methods used in the test of coating film adhesion in the practical examples and comparison examples are as described below.

(1) Coatings

A: Acrylic urethane type: Puranit #250 (trade name, manufactured by Dainippon Toryo K.K.)

B: Polyester polyol type: KPX36 Gray intermediate coating for external automobile components and Neoaramic White topcoat for external automobile panels (both trade names, manufactured by Kansai Paint K.K.)

(2) Adhesion test

According to the method of JIS K5400-1979, a 1 mm square grid test was conducted, and the rate of non-peeling following tape peeling was determined and expressed as (number of non-peeling grid squares/100 grid squares)×100 (%). Initial adhesion was measured 24 hours after application of the coating, and secondary adhesion was measured after 240 hours of immersion in warm water at 40° C.

Practical Examples 1–4

Using a continuous biaxial extruder having both upstream and downstream feed openings (TEX-30, manufactured by Nihon Seikosho K.K.), PPE, HIPS, a compatibilizing agent (citric acid), a rubber polymer (SEPS), and terpene phenol resin were inserted through the first feed opening (upstream) in the amounts shown in Table 1, PA was; inserted through the second feed opening (downstream) in the amount shown in Table 1, and melt kneading was carried out with a cylinder temperature of 290° C. and a screw revolution speed of 400 rpm to obtain pellets. The pellets obtained were used to mold strip-shaped test pieces measuring 3.2 mm in thickness and flat plate test pieces (150×150×3 mm) using an injection molding machine.

Using the strip-shaped test pieces, according to the procedure of ASTM D256, notches were made, and Izod impact strength was measured at 23° C. and −30° C. Moreover, using the flat plate test pieces, coating A was applied (baking: 40 min. at 80° C., film thickness: 30 μm), and the film adhesion of this coating material was measured. These results are shown in Table 1.

Comparison Example 1

Except for the fact that terpene phenol resin was not blended in, resin composition pellets were formed by the same method as in Practical Examples 1–4, various test pieces were then injection molded by the same method, Izod impact strength was measured, and the specimens were then used in a film adhesion test following application. The results are shown in Table 1.

Comparison Example 2

Except for the fact that terpene phenol resin having a low hydroxyl value (TP-3) was used, resin composition pellets were formed by the same method as in Practical Examples 1–4, various test pieces were then injection molded by the same method, Izod impact strength was measured, and the specimens were then used in a film adhesion test following application. The results are shown in Table 1.

Comparison Example 3

Except for the fact that the amount of terpene phenol resin used was increased as shown in Table 1, resin composition pellets were formed by the same method as in Practical Examples 1, 3, and 4, various test pieces were then injection molded by the same method, Izod impact strength was measured, and the specimens were then used in a film adhesion test following application. The results are shown in Table 1.

TABLE 1

|  | Practical examples | | | | Comparison examples | | |
| --- | --- | --- | --- | --- | --- | --- | --- |
|  | 1 | 2 | 3 | 4 | 1 | 2 | 3 |
| Components by weight) | | | | | | | |
| (A) PPE | 29 | 29 | 29 | 29 | 29 | 29 | 29 |
| HIPS | 10 | 10 | 10 | 10 | 10 | 10 | 10 |
| (B) PA | 50 | 50 | 50 | 50 | 50 | 50 | 50 |
| (C) TP-1 | 1 | — | 3 | 5 | — | — | 12 |
| TP-2 | — | 1 | — | — | — | — | — |
| TP-3 | — | — | — | — | — | 3 | — |
| Optional components | | | | | | | |
| Citric acid | 1 | 1 | 1 | 1 | 1 | 1 | 1 |
| SEPS | 10 | 10 | 10 | 10 | 10 | 10 | 10 |
| Adhesion test | | | | | | | |
| Initial adhesion (%) | 100 | 100 | 100 | 100 | 95 | 98 | 100 |
| Secondary adhesion (%) | 100 | 100 | 100 | 100 | 66 | 80 | 100 |
| Izod impact strength (kg · cm/cm) | | | | | | | |
| 23 ° C. | 80 | 81 | 78 | 69 | 79 | 77 | 31 |
| −30° C. | 13 | 13 | 12 | 10 | 13 | 12 | 5 |

As can be seen from Table 1, the resin composition of the present invention provides outstanding coating film adhesion. In Comparison Example 2, in which terpene phenol resin having a low hydroxyl value was used, the coating film adhesion effect was low, and in Comparison Example 3, in which large amounts of terpene phenol resin were blended in, coating film adhesion was favorable, but impact resistance was considerably decreased.

Practical Examples 5–7

Using the same biaxial extruder used in Practical Examples 1–4, PPE, a compatibilizing agent (citric acid), a rubber polymer, and terpene phenol resin were inserted through the first feed opening in the amounts shown in Table 2, PA was inserted through the second feed opening in the amount shown in Table 2, and melt kneading was carried out under the same conditions as in Practical Examples 1–4 to obtain pellets.

Using the injection molding machine in the same manner as in Practical Examples 1–4, the pellets obtained were molded into 13-inch wheel covers (1-point gate in center, decorative holes on the edge). Coating B was applied to this molded product as an intermediate coating followed by a topcoat measuring 30 μm in thickness each, with both of these coats being baked for 35 min. at 140° C. In the vicinity of the gate, film coating adhesion of the flat portion and the decorative holes (hole portion) was evaluated. The results are shown in Table 2.

Comparison Examples 4–6

Except for the fact that terpene phenol resin was not blended in, pellets were prepared from the resin composition in the same manner as in Practical Examples 5–7, and these pellets were then formed into wheel covers in the same manner. After application to the molded product according to the same procedure, a coating film adhesion test was carried out. The results are shown in Table 2.

TABLE 2

|  | Practical examples | | | Comparison examples | | |
| --- | --- | --- | --- | --- | --- | --- |
|  | 5 | 6 | 7 | 4 | 5 | 6 |
| Components (parts by weight) | | | | | | |
| (A) PPE | 39 | 39 | 39 | 39 | 39 | 39 |
| (B) PA | 50 | 50 | 50 | 50 | 50 | 50 |
| (C) TP-1 | 3 | 3 | 3 | — | — | — |
| Optional components | | | | | | |
| Citric acid | 1 | 1 | 1 | 1 | 1 | 1 |
| SBS | 10 | — | — | 10 | — | — |
| SEBS | — | 10 | — | — | 10 | — |
| SEPS | — | — | 10 | — | — | 10 |
| Adhesion test | | | | | | |
| Initial adhesion | | | | | | |
| Area around gate | 100 | 100 | 100 | 99 | 85 | 50 |
| Flat portion | 100 | 100 | 100 | 100 | 100 | 85 |
| Hole portion | 100 | 100 | 100 | 10 | 85 | 20 |
| Secondary adhesion (%) | | | | | | |
| Area around gate | 100 | 100 | 100 | 82 | 80 | 30 |
| Flat portion | 100 | 100 | 100 | 100 | 100 | 61 |
| Hole portion | 100 | 100 | 100 | 3 | 65 | 18 |

In actual wheel cover molded products, one can see from the comparison examples that there are variations in coating film adhesion depending on the area of application. Moreover, depending on the type of rubber polymer used, there are slight differences in adhesion. Nevertheless, in molded products made from the resin composition of the present invention, regardless of the area and regardless of the type of rubber polymer used, one can see that coating film adhesion is favorable in all cases.

The present invention provides a PPE/PA resin composition showing outstanding adhesion to coating film. Accordingly, as the primer can be omitted, applications can be carried out with considerable reductions in the process and cost, making the invention extremely useful from an industrial standpoint.

What is claimed:
1. A thermoplastic resin composition comprising:
   (A) 10–80 parts by weight of polyphenylene ether resin with respect to a total of 100 parts by weight of (A) and (B);
   (B) 90–20 parts by weight of polyamide resin with respect to a total of 100 parts by weight of (A) and (B); and
   (C) 0.3–10 parts by weight with respect to a total of 100 parts by weight of (A) and (B) of a terpene phenol resin having a hydroxyl value of 45 or above.

2. The resin composition of claim 1 wherein the terpene phenol resin is a copolymer comprising monoterpenes and phenols.

3. The resin composition of claim 2 wherein the terpene phenol resin comprises the formula

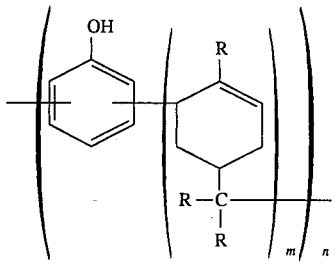

wherein R is a methyl group, and m and n are integers 2 to 10.

4. The resin composition of claim 1 wherein the terpene phenol resin is present in the amount of 0.5–5 parts by weight with respect to a total of 100 parts by weight of (A) and (B).

5. The resin composition of claim 4 wherein the terpene phenol resin has a hydroxyl value of 50 or above.

6. The resin composition of claim 1 further comprising a compatibilizing agent.

7. The resin composition of claim 6 wherein the compatibilizing agent is selected from the group consisting of
   (i) polycarboxylic acids and their derivatives, and
   (ii) compounds in which the compatibilizing agent contains (a) a double bond or triple bond and (b) a carboxylic acid group, acid anhydride group, acid amide group, imide group, carboxylic acid ester group, or epoxy group.

8. The resin composition of claim 6 wherein component (A) comprises endgroup modified polyphenylene ether resin containing epoxy, carboxy, or anhydride groups.

9. The resin composition of claim 1 further comprising a styrene resin.

10. The resin composition of claim 1 wherein the number of non-peeling grid squares/100 grid squares in a coated test specimen after 240 hours of immersion at 40° C. is improved by at least about 15% over the same composition not containing the terpene phenol resin.

11. A thermoplastic resin composition consisting essentially of:
   (A) 10–80 parts by weight of polyphenylene ether resin with respect to a total of 100 parts by weight of (A) and (B);
   (B) 90–20 parts by weight of polyamide resin with respect to a total of 100 parts by weight of (A) and (B); and
   (C) 0.3–10 parts by weight with respect to a total of 100 parts by weight of (A) and (B) of a terpene phenol resin having a hydroxyl value of 45 or above.

12. A wheel cover molded from the composition of claim 1 wherein the number of non-peeling grid squares/100 grid squares in a coated test specimen after 240 hours of immersion at 40° C. is improved by at least about 15% in the area around the gate over the same composition not containing the terpene phenol resin.

* * * * *